US008903718B2

(12) United States Patent
Akuwudike

(10) Patent No.: US 8,903,718 B2
(45) Date of Patent: Dec. 2, 2014

(54) METHOD AND SYSTEM FOR STORING AND RETRIEVING CHARACTERS, WORDS AND PHRASES

(76) Inventor: Ugochukwu Akuwudike, Cambridge (GB)

( * ) Notice: Subject to any disclaimer, the term of this patent is extended or adjusted under 35 U.S.C. 154(b) by 652 days.

(21) Appl. No.: 12/863,382

(22) PCT Filed: Jan. 19, 2009

(86) PCT No.: PCT/EP2009/050553
§ 371 (c)(1),
(2), (4) Date: Aug. 3, 2010

(87) PCT Pub. No.: WO2009/090262
PCT Pub. Date: Jul. 23, 2009

(65) Prior Publication Data
US 2010/0312549 A1    Dec. 9, 2010

(30) Foreign Application Priority Data
Jan. 18, 2008    (GB) .................................. 0800925.0

(51) Int. Cl.
*G06F 17/21*    (2006.01)
*G06F 17/27*    (2006.01)
*G06F 17/30*    (2006.01)

(52) U.S. Cl.
CPC ........ *G06F 17/30734* (2013.01); *G06F 17/276* (2013.01); *G06F 17/30654* (2013.01)
USPC ............................................... 704/10; 704/7

(58) Field of Classification Search
CPC . G06F 17/276; G06F 3/0237; G06F 17/3011; G06F 17/3002; G06F 17/30321; G06F 17/2785; G06F 17/30616
USPC ....................................................... 704/10, 9
See application file for complete search history.

(56) References Cited

U.S. PATENT DOCUMENTS 5,623,406 A       4/1997  Ichbiah
7,711,679 B2 *    5/2010  Patterson ...................... 707/715

FOREIGN PATENT DOCUMENTS

GB    2 197 097    5/1988

OTHER PUBLICATIONS

Nandi, "Augmenting Phrase Prediction Algorithms With Semantic Disambiguation", , Published in: US.
Nandi, et al., "Effective Phrase Prediction", "VLDB", 2007, pp. 219-230, Publisher: ACM, Published in: AT.
Hyvonen, et al., "Semantic Autocompletion", "ASWC", 2006, pp. 739-751, vol. 4185, Publisher: Springer-Verlag Berlin Heidelberg, Published in: FI.

* cited by examiner

*Primary Examiner* — Jakieda Jackson
(74) *Attorney, Agent, or Firm* — Loginov & Associates, PLLC; William A. Loginov

(57) ABSTRACT

The present invention relates to methods and systems for storing words and phrases in a data structure, and retrieving and displaying said words and phrases from said data structure. In particular, the present invention relates to a method and system of predicatively suggesting words and/or phrases to a user entering a string of characters into a user interface, which may be a limited user interface.

13 Claims, 4 Drawing Sheets

Structure and functionality of System

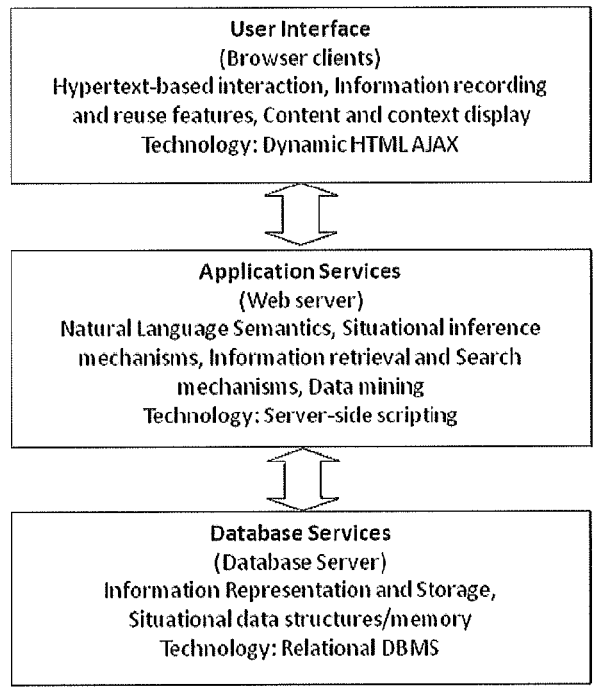
Figure 1: Structure and functionality of System
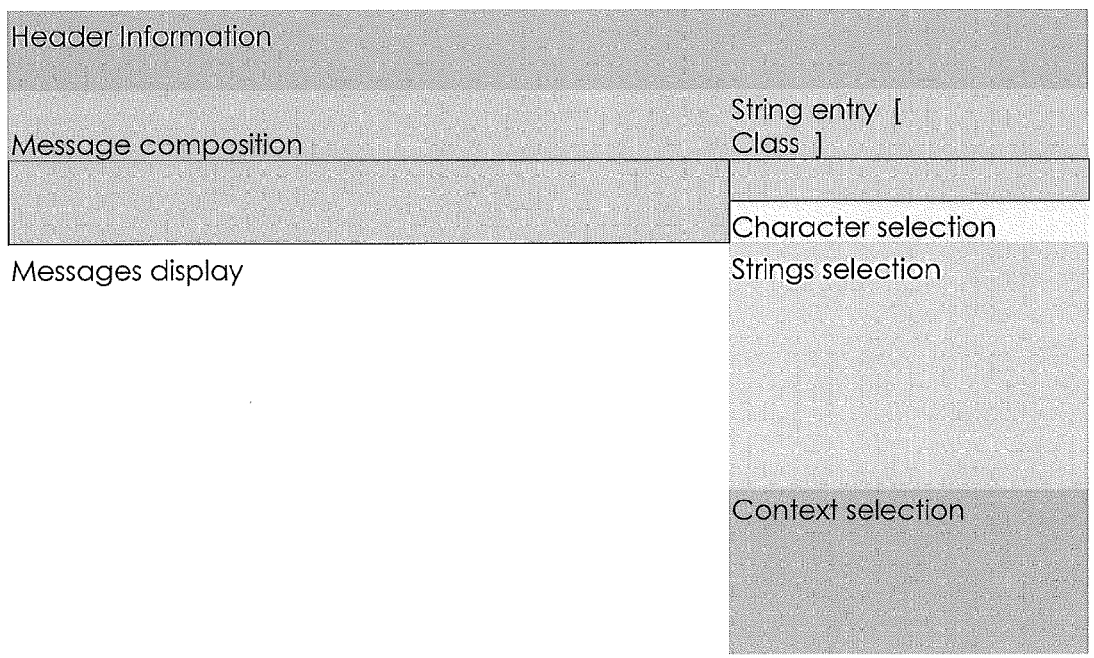
Figure 2: A layout of the Interface showing content / interaction areas

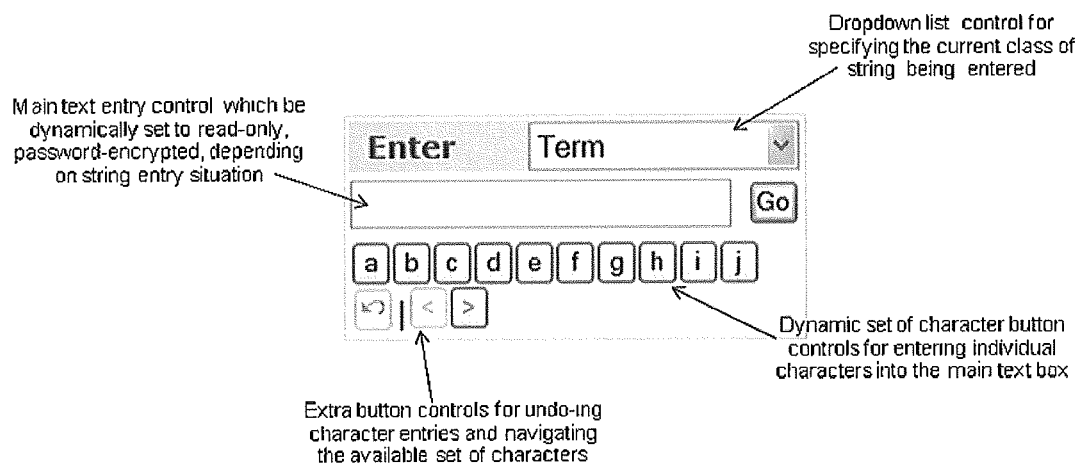
Figure 3: String entry controls
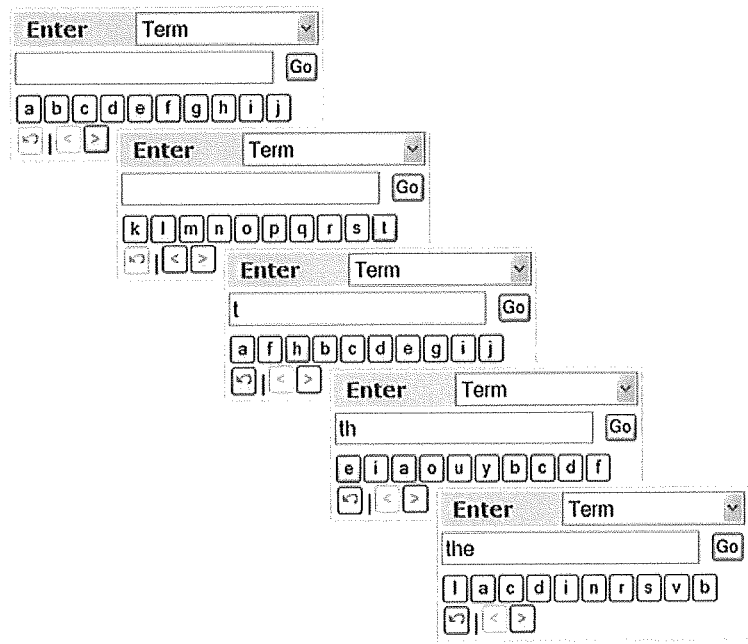
Figure 4: User interaction to enter the word 'the'

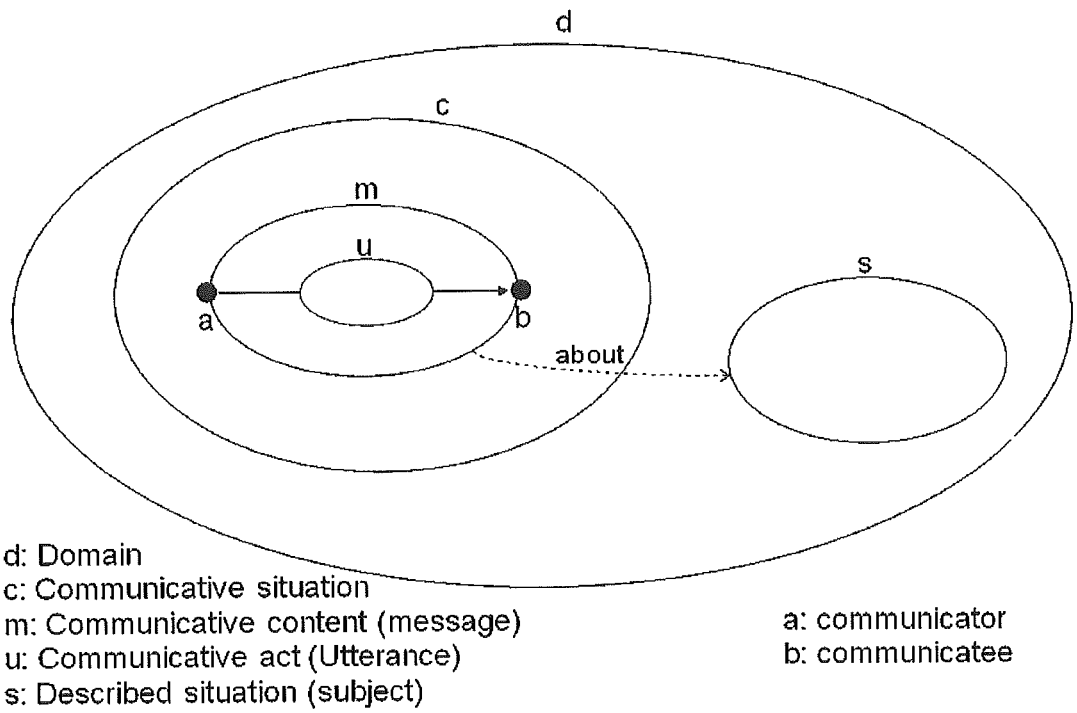
d: Domain
c: Communicative situation
m: Communicative content (message)
u: Communicative act (Utterance)
s: Described situation (subject)
a: communicator
b: communicatee
Figure 5: Conceptual structure of a communicative setting
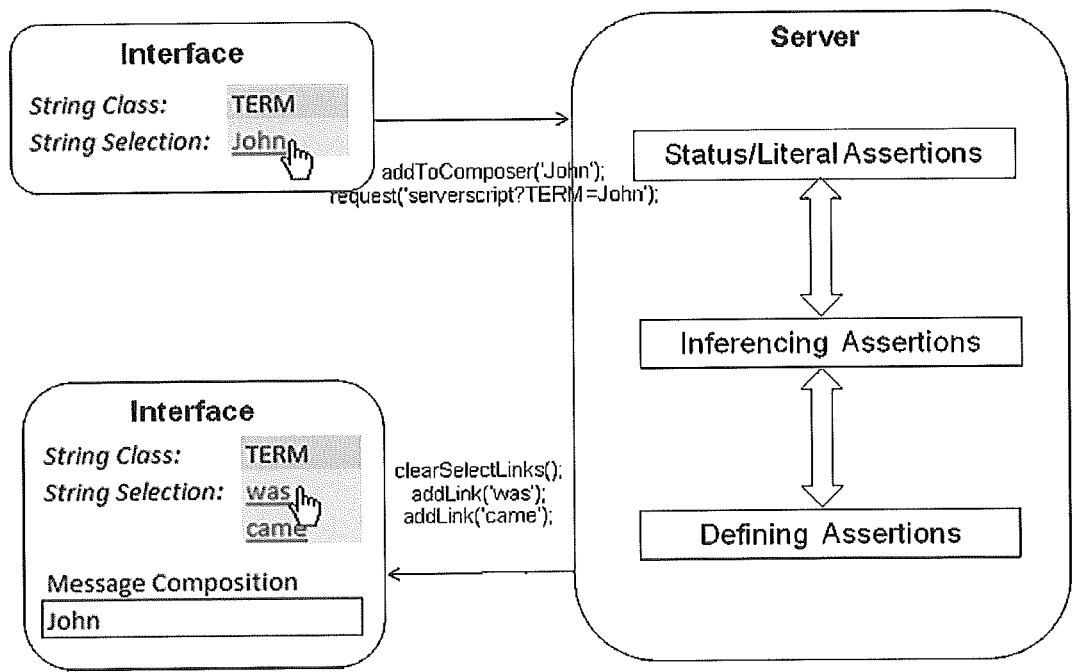
Figure 6: Information Processing between Interface and Server to support a Messaging task

METHOD AND SYSTEM FOR STORING AND RETRIEVING CHARACTERS, WORDS AND PHRASES

FIELD OF THE INVENTION

The present invention relates to methods and systems for storing and retrieving characters, words and phrases in a data structure, and retrieving and displaying said words and phrases from said data structure. In particular, the present invention relates to a method and system of predicatively suggesting words and/or phrases to a user entering a string of characters into a user interface, which may be a limited user interface.

BACKGROUND TO THE INVENTION

The Web today is one of the world's most important information and communications technologies (ICTs). It has steadily become fundamental to the way people and organisations access information, document knowledge and maintain records, in a wide range human activities from business to education. Next to paper, the web is arguably the second most universally accessible medium for preserving and transmitting the information and knowledge that is recordable in different human languages. Today, people all over the world read, communicate, share and interact with recorded data, on web pages available over the computer networks distributed across the globe.

Technically, the web is an electronic medium providing key mechanisms and a platform by which computers serve to mediate human communication. The term 'Web' is taken here to encompass all implementations of interlinked hypermedia resources delivered via the Hypertext Transfer Protocol (HTTP), whether hosted over the Internet (World Wide Web) or in intranets (local Webs). Its electronic nature means it enables speedy access to information resources as well as interactive modalities and features through which people can create, use and share information.

The web began as a platform for publishing information in a shared space accessible to a community of practitioners. It has developed over a decade from being a huge mass of interconnected hypermedia documents to a very rich and dynamic medium supporting communication across individuals, businesses, institutions, governments and cultures. Search engines, webmail, community forums, portal sites and more recently weblogs are some of the key web applications that have been responsible for the social impact and utility of the web.

Web Usability Issues

The fundamental task involved in people's use of the web is the creation, publishing and maintenance of content. This content takes a variety of forms—the various representations of information needed and used by people; and the web comprises an array of technologies, protocols, mark-up languages etc to facilitate the underlying processes of their storage, delivery and presentation. Text is by far the most predominant of these forms and is found on virtually every webpage on the internet. The huge potential arises given that web technology enables this content to be interactive, through a variety of mechanisms.

Given its global significance for communications, it is essential that solutions are sought to address the problems individuals have in using web-based means to create messages and share content. Broadly, the digital divide issues of the 21st century, present a significant challenges to global utilisation of the web. These issues concern the imbalances in physical access to web-based technology, as well as the imbalances in resources and skills to effectively utilise the web for human interactive and collaborative purposes. This is reflected particularly in the relative inability of people in developing world contexts to easily create and distribute content over the internet in their local languages.

There are a number of aspects to this problem:
Firstly, there are hard factors involved—the physical, infrastructural and economic factors constraining the availability of appropriate hardware, affecting to enable people use the web.
Also there are soft factors—the availability of appropriately designed resources and tools to interact over the web. The issue here is how well their features are adapted to the natural capabilities and understanding of people in any specific context. These arise from the basic design of web-based resources, but the resultant effect in the skill requirement for creating messages and content using web technologies.

There is thus a design imperative calling for better techniques and mechanisms for interacting with information, in order to make web applications and systems more usable. The significance of appropriately designed web resources is all the more apparent in the fact that web browsers are supporting a greater part of the interaction between humans and electronic devices of various types. There is today a proliferation of web-based user interfaces.

Web-Based Communication Issues

Web page documents have traditionally been taken as the primary unit of the storage and delivery of web content. For publishing purposes, documents could be taken as the primary content being shared amongst the parties involved. However for more interactive and communicative purposes, the main content being shared should primarily be regarded as messages. This is usually enabled through web applications.

Communication mediated over the web is also to date largely based on a document delivery approach, where individuals using browsers request and receive web pages from hosting servers. This has effectively served information publishing and dissemination purposes. The approach however has the effect of limiting interactivity, because:
(i) a user has to handle information one whole web page at a time, often having to scan through them for relevant information and
(ii) the interaction process is punctuated by page fetching and reloads, which could take significant amounts of time depending on the size and complexity of the page requested, as well as network bandwidth and traffic.

Also, the problem of spam arises because the boundary for a domain of communication cannot be effectively controlled, a fact which is evident in email and other forms of internet-driven communication tools.

Web Information Storage and Retrieval Issues

Much of the problem of enabling computers to effectively retrieve information needed by users has to do with the way the information is typically stored i.e. in documents containing unstructured content. This results mainly in information overload, whereby a lot of the information retrieved by search engines is irrelevant to the user's immediate need. A related aspect of this issue is that specifying the right query terms in order to retrieve content requires considerable skill. Alternative search technologies based on natural language have recently begun to be investigated and developed to address this problem.

SUMMARY OF THE INVENTION

One of the usability benefits of the disclosed system is the manner of interaction it provides for users in accomplishing content creation tasks, which is similar to browsing webpages. All interaction supported—from user logging in, to browsing available messages, to selecting a respondent or subject, to selecting words for a message, to associating entities to categories etc—all of these are accomplishable simply by clicking successive hyperlinks provided on the interface in response to prior selections. The design is such that only the most relevant entities in any particular situation, listed in order of relevance, are provided at any point in the course of user interaction. The aids in tackling information overload.

The methodology and system hereby disclosed provides a means by which information about situations whereby natural language is being encoded into strings and messages for communication may be represented, recorded, retrieved and reused for communications mediated by computers, devices and networks.

The system's information handling is grounded in a theoretically based representation scheme that is applied to capture the micro situations of natural language use. This situation-based formalism is deployed to define and represent a hierarchy of situations types involving the use of strings in a language—ranging from character utterances to messages communicated between individuals. Information about these situations are recorded as discrete items using a uniform structured scheme in a relational database.

The system thus enables the recording, representation and subsequent retrieval and reuse of information in the form of sequential, categorical and hierarchical relationships between the characters, symbols and string entities used in a language or communicative activity. It provides the basis for:

A database-driven application for progressively capturing and reusing a structured ontology of the linguistic terms, entities and situations communicated in a specific domain
  A user interface for composing and browsing messages simply by interacting with hyperlinks on a web interface without the need for a physical keyboard—an interface demonstrating predictive language capabilities in order to support text input and enable an intuitive mode of interaction.
  A network-based technology for storing, processing and retrieving terms and related strings data efficiently for use in communications over an internet or intranet domain.

In particular, the present invention provides a method of storing characters, words and phrases including the words, in a data structure for providing predictive output of words and/or phrases in response to user input text data, the method comprising: storing a plurality of phrases each in a phrase data structure having a phrase identifier and comprising a sequence of words of the phrase, wherein some of said phrase data structures further comprise subphrase identifier data, said subphrase identifier data identifying a portion of a phrase of a phrase data structure which corresponds to some or all of another phrase stored in a said phase data structure; identifying a previous use of a said subphrase in said user input text data and assigning a separate identifier to said subphrase in response to said identification; and storing data for a subsequently input phrase from said input text data including said subphrase as a combination of said separate identifier, a remainder of said subsequently input phrase after removal of said subphrase, and data indicating a relationship between said reminder of said subsequently input phrase and said subphrase.

Using the above method enables an efficient storage scheme in that phrases or sequences of words need only be saved once. Subsequently entered words or phrases are only stored if they are not already known to the system. When portions of the subsequently entered words or phrases are known, but others are not, the scheme stores only the unknown portions, an internal referencing scheme using relation data is used to refer back to usages of the known portions. This is advantageous in that it saves storage space and enables more efficient retrieval of the data.

In embodiments, said data indicating a relationship between said reminder of said subsequently input phrase and said subphrase comprises a phrase identifier identifying a phrase containing said subphrase, a start word of said subphrase and an end word of said subphrase, and wherein said assigning of a separate identifier to said subphrase comprises generating a new phrase comprising said subphrase and allocating a phrase identifier to said new phrase such that said separate identifier of said subphrase comprises a new phrase identifier.

In embodiments, said data indicating a relationship between said reminder of said subsequently input phrase and said subphrase comprises sequence data defining a sequence of phrases, a first phrase identifier identified by said separate identifier and a second phrase comprising said remainder of said subsequently input phrase after removal of said subphrase.

In embodiments, said data indicating a relationship between said reminder of said subsequently input phrase and said subphrase includes property data defining a property of one or both of said reminder of said subsequently input phrase and said subphrase and wherein said property data comprises data indicating punctuation of one or both of said reminder of said subsequently input phrase and said subphrase.

In embodiments, the method further comprises inferring a situation of use of said predictive output from said user input text data, and wherein said storing and identifying of said repeated subphrases is responsive to said inferred situation of use.

In embodiments, said identifying of said previous use of said subphrase comprises identifying greater than a threshold count of instances of said previous use of said subphrase.

In embodiments, said phrase data structure comprises relational data defining a relationship between neighbouring characters or words within a phrase.

Preferably, said relationship comprises one of "currently referring to", "is an instance or example of", "is a type, category or group of", "has the property, aspect or entity", "is followed by", "is communicating with" and "is a part of or is about".

In embodiments, said phrase data structure comprises criteria data defining a limit to which instances of a subphrase may be used in subsequently input phrases.

In embodiments, said phrase data structure comprises polarity data defining a positivity or negativity of a said subphrase.

In embodiments, said phrase data structure comprises a timespan identifier identifying a said phrase or a said subphrase. Preferably, said phrase data structure comprises data defining a relationship between timespan identifiers of different phrases and subphrases in said phrase data structure.

Preferably, said phrase data structure comprises usage data defining a frequency of use of a stored subphrase, and wherein said usage data is increased upon successful identification of a previous use of a said subphrase.

The present invention also provides a data structure storing data according to the above method.

The present invention also provides a method of predicting phrases in response to user input text data, the method comprising: inputting multiple instances of said text data, each comprising a phrase; storing said phrases in a data store using the above method of storing words and phrases; inputting a further instance of said text data; identifying words within said further instance of said text data during said inputting; matching said words with said stored phrases during said inputting; and outputting data for providing to said user predicted further words of a phrase predicted by said matching.

In embodiments of the method of predicting phrases, the method further comprising storing grammatical data in association with said stored phrase data structure, and wherein said outputting further comprises outputting grammatical data to enable formatting of said predicted further words of said phrase.

The present invention also provides a data structure storing data according to the above method.

The present invention also provides a data carrier carrying computer program code to implement the method of predicting phrases.

The present invention also provides a computer system for providing predictive output of words and/or phrases in response to user input text data, the computer system comprising: an input to receive said user input text data; an output for providing to said user predicted further words of a phrase predicted by said system; a data store storing a plurality of phrases each in a phrase data structure having a phrase identifier and comprising a sequence of words of the phrase, wherein some of said phrase data structures further comprise subphrase identifier data, said subphrase identifier data identifying a portion of a phrase of a phrase data structure which corresponds to some or all of another phrase stored in a said phase data structure; and computer program code for: inputting multiple instances of said text data, each comprising a phrase; identifying a previous use of a said subphrase in said user input text data and assigning a separate identifier to said subphrase in response to said identification; storing data for a subsequently input phrase from said input text data including said subphrase as a combination of said separate identifier, a remainder of said subsequently input phrase after removal of said subphrase, and data indicating a relationship between said reminder of said subsequently input phrase and said subphrase; inputting a further instance of said text data; identifying words within said further instance of said text data during said inputting; matching said words with said stored phrases during said inputting; and outputting data for providing to said user predicted further words of a phrase predicted by said matching.

The present invention also provides a user interface for providing predictive output of words and/or phrases in response to user input text data, the user interface in communication with a data store storing a plurality of words and phrases, and the user interface comprising: a string class input for selecting a string class from a list of string classes, each string class defining a class of string to be entered by a user; a character entry input for entering characters into said interface, said character entry input displaying a sub-set of characters from a set of characters for selection by a user; a string selection input displaying a set of words or phrases stored in a data store and for selection by a user, wherein, said set of words or phrases displayed in said string selection input is dependent upon a selected string class, one or more characters previously entered into said character entry input and/or a word or phrase previously selected from said string selection input.

In embodiments of the user interface, said list of string classes comprises: characters, terms, numbers, contacts, subjects, punctuation marks and actions.

In further embodiments of the user interface, said sub-set of characters from said set of characters is dependent upon a selected string class, one or more characters previously entered into said character entry input and/or a word or phrase previously selected from said string selection input.

In embodiments of the user interface said words and/or phrases stored within said data store comprise context data defining a user-allocated situation to which said words and/or phrases relate, and wherein said user interface comprising a context selection input for displaying said words and/or phrases having corresponding context data, for selection by a user.

In embodiments of the user interface, the user interface comprising a message composition portion for composing a message of a sequence of words and phrases, said message composition portion displaying a sequence of words and phrases selected by a user from said string selection input.

The present invention also provides a data carrier carrying data defining the user interface.

The present invention also provides a method of entering data into a system, said data comprising a string of characters, words or phrases, said method comprising: sensing a string entity comprising one or more of said characters, each of said characters associated with a class of string; defining a situation in which said sensed string entity belongs; inferring a type of situation of said sensed string entity by identifying a known situation type of said sensed string entity using said type or class of strings associated with said sensed string entity; inferring other situations associated with said inferred type of situation of said sensed string entity; retrieving string entities from said inferred other situations associated with said inferred type of situation of said sensed string entity; displaying said retrieved string entities for selection by a user.

The present invention also provides a system for processing natural language linguistic data represented by a text string, the system comprising: a text entry interface to enable a user to enter said text string, said interface being configured such that, at a given time, a limited subset of characters from an alphabet of characters used by said natural language is available; and a text processing system, configured to operate on said text string to convert said input text string to a natural language text string in said natural language using substantial a full said alphabet of characters such that said natural language text string is human readable; and wherein the system further comprises a context determination system to determine a context of said text string, and wherein said conversion of said input text string and said natural language text string is responsive to said determined context.

Preferably, said context comprises one or more of a context of use of said interface by said user, a linguistic context of said input text, in particular as determined from said processed natural language text or from said input text, and a learnt context of use of said system.

The present invention also provides a method of web-page based data entry for entering data into a web-based form, the method comprising: selecting a first subset of characters from a plurality of displayable characters; displaying said first subset of characters; reading a user-selected character selected by a user; and selecting a second subset of characters from a plurality of displayable characters; displaying said second subset of characters, wherein said selecting of said first and second subset of characters is dependent on one or more of a previous character selected by said user, a number or type of character fields, and said read user-selected character.

BRIEF DESCRIPTION OF THE DRAWINGS

The present invention will now be described by way of example only, and with reference to the accompanying drawings, in which:

FIG. 2 shows a layout of the Interface showing content/interaction areas;

FIG. 3 shows the string entry controls;

FIG. 4 shows a user interaction to enter the word 'the'; and

FIG. 5 shows a conceptual structure of a communicative setting; and

FIG. 6 shows information processing between Interface and Server to support a Messaging task.

DETAILED DESCRIPTION OF EMBODIMENTS OF THE INVENTION

Figure 1:
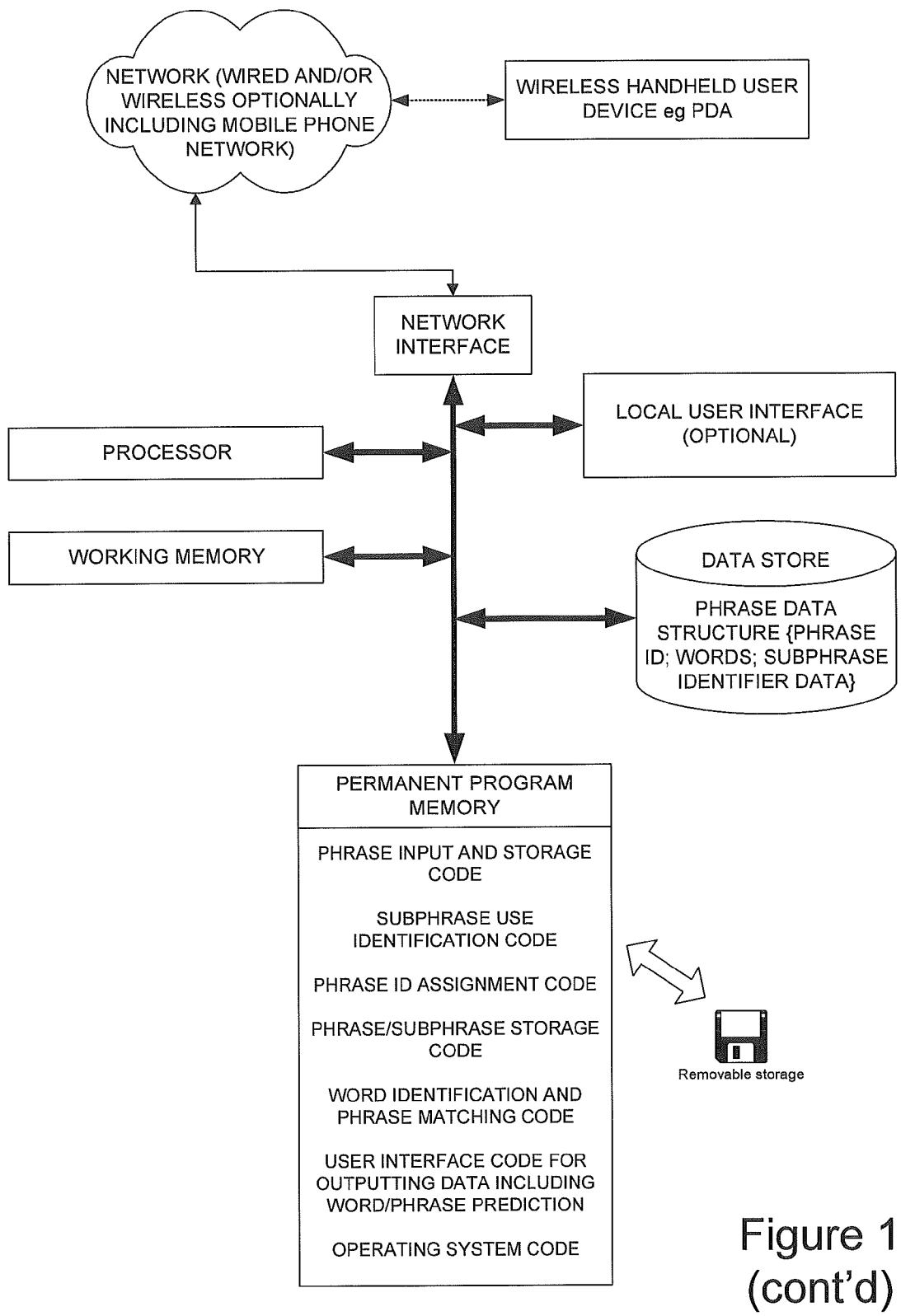
FIG. 1 shows the structure and functionality of such a system.

The disclosed system was designed to capture, reflect and support the manner in which people in different settings communicate using symbols, representations and other informational entities. This required a conceptualisation of how information arises from the entities exchanged between people using a natural communal language, as well as how the knowledge and meaning from these entities are shared and preserved. Much of the theoretical understanding applied towards this has been documented in prior research work. Below however is an outline of the main concepts applied.

Definitions of some of the key terms used subsequently in this system description:

Information: the phenomenon occurring or that which is conveyed when data representations of some form which are present in a particular situation, cause knowledge or memories of that and related situations to be evoked.

Knowledge: the capacity or asset of individual cognitive entities which enables them maintain an awareness and understanding of situations in their environment for use in effectively interacting with and within that environment.

Language: a systematic means of communicating by the use of sounds or conventional symbols.

Formalism: A set of symbols and a collection of systematic rules governing their uses and interrelations.

Situation: The general state of things; the combination of circumstances at a given time; an aspect or part of the real world.

Ontology: An explicit specification of a conceptualization. A way of describing the categories of things that are in the world.

Language is a vital element of the collective or organisational culture or memory of a particular community. In particular, language provides a common record or memory of how people communicate. Significant aspects of their tacit knowledge are manifested in the way people string characters and terms together in written communicative acts. This capacity is clearly linked with memory. In the same way that one word creates a meaningful context for subsequent words, that same word could regarded as a kind of mnemonic cue for the terms succeeding it, as they are understood and used by the individuals in a particular setting. A system can thus mediate and support people within such settings in their communications, by augmenting the memory capabilities involved in using their language.

Situations

The idea of a situation is one that people can easily relate to but often can't easily define. The situations concept has however been formulated theoretically to reflect the fact that individuals are situated in, think in terms of, and communicate about of limited parts of the world. Situation theory (ST) was formulated as a theory of information as it exists in the world. Situations, the core concept in ST, are parts of the world which are clearly recognised (although not precisely individuated) in commonsense and human language [Barwise, J. & Perry, J. Situations and Attitudes, MIT Press (1983)]; limited parts of reality from which information is extracted by cognitive agents. 'Situations are an attempt to capture, within a rigorously defined ontology, the role played by context in reasoning and communication [Delvin, K. and Rosenberg, D. (1996). Language at Work, CSLI Publications: p. 109]

The ontology of situation theory includes the following primary elements—situations, individuals (objects), relations, spatial and temporal locations, truth values (polarities). In the ST view, relationships between entities are the basis of capturing, representing information and semantics.

ST is useful as an underlying framework supporting this system and methodology for the following reasons It provides a conceptualisation of information as the occurrence or non-occurrence of a definite relationship between a number of definite entities, perceivable within the world of a cognitive agent.

It provides a formalism/meta-language for representing information using structured formal logic. This implies firstly that it is neutral to the particularities of any human language; and secondly that is mathematical and thus amenable to straightforward computation.

The ST 'infon' construct offers a way of handling information in discrete units

The ST 'constraint' construct defines a mechanism by which information in [or about] one situation flows or leads to other situations. Constraints themselves can be expressed and represented using the formalism of situation theory i.e. as a kind of relation between types of situations, which holds or does not hold in another contextualising situation.

It supports a relational theory of meaning and semantics that links the utterance of linguistic entities firstly to the types of situations that such utterances describe, and secondly to the situation in which such utterances are made.

The entities in a situation inform and characterise it. A situation could be a concrete or abstract one. The 'size' of a situation could vary in scope or extent, from the context of particles in an atom to macroeconomic conditions in a country. Intuitively, a situation can be a part of another situation and thus minute situations can signal larger situations. In the current system, the concern is interactive situations of individuals accessing and using bits of information. These situations are linguistic and communicative i.e. involving symbols, terms, messages and communicants.

By linking the occurrence of a particular relationship between entities to definite situations, the system can become aware of the occurrence of certain types of linguistic situations, and consequently what other types of entities may follow in an unfolding communicative situation Strings Strings are sequence of characters denoting terms or tokens in a written language. They stand for entities instantiated in the use of a language in making statements, and refer to objects/concepts in the real world or mind of the individuals in the communicative context.

Strings thus form an element of the information system being described. Technically, strings are an appropriate representation to use [as a store of information] given that they occur and are used all throughout the data storage framework of a computing system.

But they are here being treated linguistically, beyond their definition just as a data type within a computer. A string functions as a unique identifier for an entity in a given situation. They denote individual entities in a language's ontology or lexical space.

The situation-theoretic framework can accordingly be used to define and structure an environment involving written language entities and their use by a community of people, which is being embodied in the described information system. Here, the uniformities—objects, situations, relations, time spans as prescribed in a ST ontology, which are discrimable, shared by and communicable by users of the language, are stored and can be taken to exist in the system as strings.

Defining String Entities

Thus, a unit of linguistic information is stored in these strings. In the system's implementation, each informational entity stored is a sequence of characters without any embedded spaces, each being at least one character long.

Strings once instantiated would fall under one of the basic ontological categories derived from the situation theory that are applicable to the system:

| String class | Theoretical uniformity | Records or represents |
| --- | --- | --- |
| OBJECT | individuals | definite entities referred to in a language |
| RELATIONS | relations | entities that hold of or link together certain other entities |
| TYPE | types | higher order categorising entities |
| SITUATION | situations | parts of the world or prevailing circumstance |
| TIMESTAMP | temporal locations | points or regions of time |
| POL | polarity | truth or negativity |

String Instances and Types

The type class of string is a special one. Any new string defined would either be an instance of a definite entity (object, situation, relation or timestamp), or it would be type string—a categorising/organising feature used to refer to, represent a set of other definite instances. But this new type string would itself an instance of an object-categorising/organising kind of string or simply 'object-type'. Object-types differentiate sets of instances of a particular object, and are of a different ontological status in ST terms from other definite entities. However, an object-type could subsequent be treated as an ontological object in a new situation—where it has to serve as the primary attribute of other new object instances.

The idea of string instances and string types, could be understood respectively in the related concept of string literals and string parameters/variables. The type is a store or placeholder for a set of instances.

Hyperlinks

These are one of the main features of the web enabling users experience and browse through information within it. They serve to link one unit of information to any other unit of information over the internet. They provide structure and navigational capabilities to websites and are the primary means of accessing web documents.

Hyperlinks however are to date mainly deployed as information retrieval mechanisms, and only play a limited information recording purpose on websites. An example of an information recording utility is the bookmarking links provided on web pages/sites for users to save links to those sites/pages, to their profile page or space usually on a social networking site.

Web-servers actually do record user access to web pages from hyperlinks. However, this is a logging function that is often simply used to communicate aggregate usage of a site to its administrators. This situation is mainly because in the standard HTTP framework, hyperlinks are primarily webpage retrieval mechanisms.

Technologies like dynamic HTML and AJAX can however, create useful possibilities by enabling hyperlinks to initiate scripted routines. Hyperlinks can access local client scripts within browsers, or they can access remote server scripts. Furthermore, because server scripts can create client script, data can be processed in a variety of dynamic ways between server and browser. On clicking a link, rather than returning a web page, a request could be sent asynchronously to a server to run some script to record some data and return just the content needed for display to the user. The content returned could form the basis of the user's subsequent request. Hyperlinks can thus serve to fuse information retrieval, recording and reuse into a single information access activity.

FIG. 1 shows the structure and functionality of such a system.

System: Structure and Features

The system's design is based on the concept of infons and situations—constructs defined in Situation Theory, which provides a theoretical understanding of how information arises and flows in the world, as well as a framework for representing propositions or assertions in a language. Infons are items of information. An infon expresses a relation between a number of entities existing in a domain of consideration, which can be declared to be or not to be (represented with a polarity of either 1 or 0).

Accordingly, the system implements a representation scheme for storing messages using structured data representing relationships between strings. The structured nature of the information thus recorded makes it easier to process by computers. The system also employs a set of routines and algorithms for retrieving relevant entities and reconstructing string sequences from the volume of string entity relationships stored in its memory.

Framework

Functionally, three aspects of the system can be distinguished and are subsequently used in this description:

1. Model: The part of the system reflecting and preserving its memory or ontology of string entities and relationships of the natural language or communicative scenarios about which information is being represented, recorded, retrieved and reused.

2. View: The interfaces or artifices by which users or other agents may interact with the system, performing natural language encoding or messaging tasks involving the representation, recording, retrieval and reusing of information.

3. Controller: The request-process-response mechanisms by which the system performs its information recording, representation, retrieval and reuse operations against its data model, in response to requests from agents interacting with the system.

The Model

The system performs its functions of transmitting and preserving information and messages, by acting as a linguistic memory. This memory capability is enabled by a collection of structured records—data structures which capture the relations and associations instantiated between string entities that inform about particular situations of language use.

Software:

The model exists in the backend of the system, and is hosted on a computer regarded as the server. This server includes two software components representing the bottom two layers of FIG. 1, providing both application and database services.

Server Application: This maintains an active data representation of a domain environment and current users' session of interaction, as well as a short-term memory of the information being exchanged in an interactive situation.

Server Database: This maintains over a longer term the information and messaging situations recorded and enacted in the use of the system, as well as the linguistic entities communicated and shared by members of a domain.

Thus, in a manner akin to human memory which has short, medium and long-term aspects, different data structures are deployed to enable storage and later retrieval of different kinds of information being preserved for varying timespans/longevity.

Features:

A uniform scheme or data structure for each discrete record or item of situational information in memory. This structured scheme of recording information as deployed in this system involves the following set of fields:

infonID—placeholder for a string entity that is unique to every record or item of information with the system's memory. The infon refers specifically to the assertion given by the following subsequently defined fields: relation, param1, param2, timespan and polarity.

relation—placeholder for the class of entity that binds two entities in a given situation param1—placeholder for any specific entity, which could refer to any other class of entities in the current consideration, and typically treated as the subject of the relation param2—placeholder for any specific entity, which could refer to any other class of entities in the current consideration, and typically treated as the object of the relation timespan—placeholder for class of entity used to denote the temporality of the asserted information polarity: placeholder for a binary entity signifying the positivity or negativity of the represented information The above define the asserted content of the recorded information. They are however connected with the following situation: placeholder for a string entity denoting the contextual situation (occurrence, event, sequence, domain, or aspect of the domain) making the asserted infon real or factual, or that is informed/described by the asserted infon criterion: placeholder for the class of situation string entities which provide a set of conditioning assertions that the designated situation (previous field) involves, or which constrains/limits the set of situations an infon can apply to or be grounded in Some additional field elements employed in the system's model are highlighted in Table 4.2. The system maintains a metric recording the usage of each recorded string relationship. This is used to compute the relative strength/relevance of particular relationships between string entities in particular situations. In addition, the status data elements St1 and St2 are used to indicate whether each of the entities in param1 and param2 respectively of a relation, is an explicit definite entity recognisable to users or an internal representation created by the system.

The basic form of the record schema used for storing information is highlighted in Table 4.2 subsequently below. Two fields in this scheme—the parameter fields, PRM1 and PRM2, can contain any class or type of string. Apart from these, every other field in the record schema can only contain certain kinds of strings signified by the primary string class by which the field is named. Once a string has been declared to be of a certain string class or string type, then it can be placed in any of its appropriate field(s).

Accordingly, in the preferred embodiment using a relational database, each record would unless otherwise noted include each of the following elements:

An unique identification string

A situation string signifying the context for a connected piece of information

A criterion string for conditioning the given situation (in some cases)

A relation string linking other parametric entities in the represented information At least two parameter strings denoting entities linked by the given relation A time stamp string denoting the temporality of the representation information (in some cases)

A polarity string signifying the positivity or negativity of the represented information A usage metric string recording the number of times the asserted information has been encountered Below are examples of string entities defined and used as primary relations between pairs of entities 'a' and 'b'. Some relations like 'is' are self-evident in a situation; others like 'is-followed-by' are proposed.

TABLE 4.1

Some primary relations

| Relation | Description | Can apply to: |
|---|---|---|
| is | 'a' is curently refering to 'b' | any entity |
| instance-of | 'a' is a 'b' or a is an instance or example of 'b' | any entity |
| type-of | 'a' is a type or category or group of 'b' | any entity |
| has | 'a' has the property or aspect or entity 'b' | any entity |
| Is-followed-by | 'a' is followed by 'b' in written or uttered sequence | characters, terms or other utterance entities |
| commune | 'a' is communicating with 'b' | individuals, contacts |
| part-of | 'a' is a part of or is about 'b' | situations |

Assertions in Memory

For users to select and interact with string entities, they must be already present in the memory of the system in some form. The system stores information in a domain as a collection of records using a uniform schema. Each record represents a structured declaration or assertion of information involving a set of string entities.

The assertions are thus records of information about particular situations, and their declaration is basically an act of creating a record or memory of the particular formal information and situation in the system.

The above scheme is used to declare assertions and propositions being recorded within a domain. At least three types of these formally structured assertion records can be distinguished:

Firstly, there are records representing information asserted about the entities and types of entities that have been instantiated in the existence of a domain. These could be referred to as defining assertions.

Secondly, there are records representing information asserted about the types of situations typically enacted by users, involving types or classes of entities. These could be referred to as inferencing assertions.

Thirdly, there are records representing information asserted about the actual sequence of literal string entities as used in the language through which communication is being conducted. These can be referred to as literal or status assertions.

These three types are subsequently highlighted in the assertion records presented in the figures within this description, using the following colour scheme:

Assertion types
- Defining
- Inferencing
- Literal

Information Representation

Using this record schema of the model, the system is able to store internal representations about:
- The range of string entities used in a language within a domain (characters or terms)
- The linguistic types or categories to which string entities are associated
- Situations whereby certain string entities follow one another sequentially (particular words or sentences)
- Situations whereby one string entity has a hierarchical association with another string entity (sub-type or property relationships between words or objects)

TABLE 4.2

Examples of the above different kinds of information

| SITN | CRIT | REL | PRM1 | PRM2 | TMP | POL | Use | St1 | St2 |
|------|------|-----|------|------|-----|-----|-----|-----|-----|
| domain | | _instof | the | _TERM | 1 | 1 | 1 | 1 | 0 |
| domain | | _instof | the | article | 1 | 1 | 1 | 1 | 1 |
| domain | | _typeof | article | _TERM | 1 | 1 | 1 | 1 | 0 |
| message | | _isflwdby | hello | there | 1 | 1 | 1 | 1 | 1 |
| utterance | | _has | verb | tense | 1 | 1 | 1 | 1 | 1 |

Other internal representations include:

Undefined strings entities: These are random-character constituted strings used to denote and record situations and entities in the memory of the computer. These are used in particular for the following classes of entities.

Aliases: These are randomly generated string entities used to substitute in other particular string entities in certain situations. Typically when a particular string entity is used repeatedly in a sequence, an alias is used for each subsequent duplicate entity in order to preserve the integrity of the overall sequential information recorded.

Time Strings: In order to identity the particular instants and eras in which messaging situations are occurring, a unique timestamp/timespan string entity is created whenever a new interactive event is encountered. A time string is string generated uniquely in the event of a record of formal information becoming true, and is associated with at least one string entity represented in the structured information record.

This is useful in representing the 'current period of time' within the system. A particular string-class, 'NOW' for example, can denote a class or category for all other strings which represent current instants or intervals of time.

This is akin to human understanding of current time. If for example the current time were 1500 hrs Saturday, 3 Mar. 2007, any of the strings '3 pm', 'March', '2007' would be addressing the current time depending on the context or specificity.

The significant utility of timespan/timestamp strings is that whenever a time-based string entity can be inferred to have expired, any information record associated with it can in effect be deleted from the system's memory.

The View

As a design goal, the strings recorded in the system's model are to be captured through the modalities of natural language use in the composition of messages, as well as intuitive categorisation of terms and objects by individuals, for later retrieval and use. Thus the system's view component is designed with features to support users in performing such messaging and language interactions via the interface, in a natural, intuitive and stepwise manner.

Interface: Its functionality is twofold. On one hand, it displays all the informational and interactive entities relevant to a user's current communicative situation. On the other hand, it enables string entities to be entered into and requested from the system's model.

In a web-based implementation, it enables textual information (characters, numbers, terms and expressions) to be composed, entered and reused completely through hyperlinks.

FIG. 2 shows a layout of the Interface showing content/interaction areas.

In the preferred implementation, the system's interface includes a set of HTML controls designed to afford data and text input, all from the screen using point and click modalities. Its text entry facility supports the variety of string-based data which would be entered into the system by users in the course of linguistic interaction. Different classes of strings would be relevant in different situations. Consequently, by enabling users specify the string type from a dropdown list, a single box can be designed for use in entering strings of various kinds.

FIG. 3 shows the string entry controls

The following features characterise the interface
- A single textbox on the user interface for all text entry input. This is supported by a dropdown list for specifying the string type being entered and a field of dynamic character buttons for composing the string, both displaying selectable entities in a contextually sensitive manner.
- The use of hyperlinks to present strings and other informational entities which users can select to compose other linguistic/communicative strings on an interface, and to record formal situational information in the system's memory. When suggested, these interactive entities on the system's interface are listed in order of predicted relevance to the user's immediate situation.

The Controller

In its operation, the system connects the visible interactive information on the interface to the situational information recorded on the server. There is related information embodied in the operational data models of both the frontend and back-end components of the system—the HTML document object model on the interface (the view) and the SQL relational data structures on the server (the model). Conceptually, the controller is involved in mediating the between these two information representations. Programmatically, the controller handles and manipulates these two related representations dynamically via client (browser) and server scripts.

Implemented in a suitable client-server supporting language, the controller provides the programmatic interface for performing operations on the system's memory and ontology, involving processing and access of information in string data.

Features:
Messaging activity is modelled in this system as a chain of situations, each involving the utterance of a single language entity. These utterance situations are occasions by which users actually interact with the contents of the system's memory, via its interface. An utterance involves a user selecting a term or expression displayed on the interface, or entering a new one. At any point or event in the interaction/messaging activity of a user, at least one a piece of information about a user becomes true or apparent. Thus in an utterance situation, a single informational entity is exchanged leading to a new situation.

To enable this form of messaging activity, the system implements an interaction modality whereby terms are linked together by hypertext functionality. This is such that the selection, click of a term triggers the retrieval of other terms associated with it, in a particular communicative situation. Messages can thus be constructed by users through by clicking on hyperlinks in succession. Information is thus recorded as successive terms are selected, in the manner of natural language use.

The controller can be programmed with a set of scripts and algorithms to effect the following data access routines, in response to request via the system's interface:
    Suggest relevant string entities
    Search for relevant contextual string entities
    Identify entity and situation types
    Record individual string entities
    Record string entities constituting a block of text
    Parse a block of text The server controller handles user requests via a set of scripted routines involving the following cycle of activities:
    Sensing the string entity: The server application detects the string selected or entered, and also the string class it is being associated it.
    Representing the situation: the current information represented formally by a relation string asserted between the two strings thus detected. The system instantiates a situation to record this information.
    Inferring the kind of situation: The system then abstracts over this formal information, by replacing the literal strings with their immediate type or class strings, to identify its known situation type. For this, the system obtains a set of types associated with the current string.
    Inferring associated kinds of situations: The system then checks its existing records to determine other known situation types related to the current situation type, as denoted by its string entity. These could be other situation string entities that the focal situation type is a part of, or is constrained to by previous association.
    Obtain related string entities: the system retrieves a set of string entities which are related to the current string entity or the string class or types associated with it, in the context of the types of situations evoked from the previous step.
    Display string entities in response: The response to be would comprise informational entities expected by user on the systems interface. These could be relevant subsequent characters for typing a word, relevant subsequent words for composing a message Effective retrieval of information entities from large sets of strings recorded in memory, through a spreading-activation mechanism. In a relational database implementation, the string entity or set of entities required at the processing routines outlined above, are performed effectively by issuing corresponding SQL queries on the database.

Thus with each click or selection of individual string entity, the system infers the interactive and communicative situation of the user, and then generates a response. The response would include a set of strings—character symbols, terms and phrases and also whole messages etc, as well as scripted actions, necessary to update the interface with or without a full page reload.

Software Implementation

In the preferred web-based implementation, the controller acts as a software agent responding to the user requests over a HTTP realised session.

The continuous interaction required between the system's interface and server is enabled via an Asynchronous HTTP request model (AJAX) [Garrett, J. J. (2005), 'Ajax: A New Approach to Web Applications', Adaptive Path Inc. http://www.adaptivepath.com/publications/essays/archives/000385.php]. This involves processing the small amounts of successive string data exchanged between the interface and server. String data is stored in hyperlinks and other interactive controls on the interface web page. When selected, the data embedded in a hyperlink or other control is sent asynchronously to the server, encoded in the query element of a URL string denoting the request usually as follows:

?STRINGCLASS=STRING

System Operation

The system could thus be seen to enable four main information functions in its operation namely, information recording, representation, retrieval and reuse. The information representation and recording functions have already been described in the previous section on the model. In each of the routine steps outlined above, if an information record, including a situation entity and the formal information asserted in it, do not already exist in the system's memory, then it is created. Also for every time this situational information record is encountered, a corresponding usage metric is incremented. This is used to represent the strength of the relationship between the entities involved in the formal information asserted.

Information Retrieval

The system's information retrieval objective is to obtain the most relevant linguistic entities needed by users in particular interactive situations of communication. At a basic level this simply involves retrieving strings associated to other strings in the system's relational database. The structured nature of the information recorded, means that strings retrieval is fast and straightforward via SQL techniques.

However, given the huge potential number of string entities that would be captured through the system's methodology, and given the important goal of easy and efficient interaction, only the most relevant informational entities need to be provided to the user in any particular situation. Furthermore, suggested entities have to be listed in order of likely relevance so that they can be easily selected.

For these reasons, the system stores a useful metric indicating the number of times a given relationship of strings in particular situations, has been encountered. This applies to all assertion records, but is particularly relevant to the inferencing and literal assertions. Using this metric, the system can rank string entities defined in a particular situation in order of their relationship to the current focal string entity, and thus display or list them accordingly.

In addition however, two other factors affect the relevance of suggestible strings. The first is that the suggestion should be done in a wholesome manner. For example, in composing the string 'm-o-n-d-a-y', the relative relevance of vowels after the consonant 'd' should depend not simply on the letter 'd', but on the entire 'm-o-n-d' sequence gone before. The system will suggest characters (and words) accordingly if any word starting with 'mond' has been previously been composed into the system's memory. This is possible because the system links any string entity sequence to a situation, denoted in the case of character sequences by the word-string being composed. But where no such recognised situation exists, the system suggests characters from the applicable string pair sequences recorded in its memory.

The second factor applicable in particular to composing phrase utterances, is that the relevance of a set of entities to a particular string entity is often determined by the semantics of the prevailing situation. This is characterised by the types of entities and situations latent in the current situation. Consider for example, composing the utterance 'she sings in the choir' and having now selected the string 'the'. Basic string sequences would be inadequate for inferring the next relevant entities, given there are so many possible strings that could follow the string 'the'. There is however some likely 'musical' category which would link the string 'sings' to the last intended string 'choir'. This category would also possibly be linked to the categories which entities in the utterance are linked with, such as 'individual', 'act', 'group' etc. These set of categories would be associated with one another, either through the apparent primary 'is followed by' relation linking strings linguistically, or through some more semantic relation strings. The latter may be derived from patterns in the relationships formed by these category strings in a range of similar situations.

For this above reason, the system enables users associate category strings to the literal strings being entered during message composition, using the dropdown selector on the interface. This is similar to the practice of tagging performed on documents, media and other resources over the web. The inferencing records in the system's memory include an assertion that strings of the 'Term' class have an object-type (category) associated with them, and thus each term string is assigned at least one category string. In addition, they can also tag the actual situations represented by the utterance being composed, in order to register human understandable contexts to further aid in retrieving the relevant string entities.

Retrieving Entities via a Graph Structure

A spreading-activation technique known as contextual network graphs (CNG) is employed to search the string-category relationships relevant to a user's current situation. It is applied by treating the string entities in a set of formally asserted information as nodes in graph-like network. The CNG recursive procedure distributes energy across the graph structure beginning from a certain node. The starting node would be the string category currently associated to the string for which relevant entities are being sought. Nodes that acquire energy above a specified threshold comprise the desired set and can be ranked in order depending on their energy levels.

Information Reuse

As previously noted, one of the system's goals is to provide people using a language with the successive strings relevant to their communicative activity, via its predictive capability. In stringing up characters, terms and phrases to compose messages, people are using bits of information about a language that are commonly shared. The system addresses the need to store and present these entities so people do not have to compose them at every messaging situation. There is a consequent challenge in the amount of records involved in capturing the multiplicity of relationships between strings that could be asserted in a language, by users of the system.

The system's design reflects the principle that information in one context can be reused in a different context, either to save the amount of records need to store information about strings, or to save on the on the amount of interactions performed on interface to compose messages. This information reuse principle is based on the fact that string entities usually form part of other string entities, and also that particular strings can be used in different linguistic utterances.

Firstly, the efficient storage is enabled through the structured scheme supporting each record and the unique but consistent relationships captured in string assertions. The table below illustrates the situations in which the character sequences for three different strings are recorded—'form', 'informal' and then 'inform'. In each case, a unique string is used to denote the situation in which the sequence is being recorded, which conveniently is the name of the string.

| SITN | CRIT | REL | PRM1 | PRM2 | TMP | POL | USE |
|---|---|---|---|---|---|---|---|
| form | | isflwdby | f | o | | 1 | 3 |
| form | | isflwdby | o | r | | 1 | 3 |
| form | | isflwdby | r | m | | 1 | 3 |
| informal | | isflwdby | i | n | | 1 | 2 |
| informal | | isflwdby | n | f | | 1 | 2 |
| informal | form | isflwdby | f | m | | 1 | 2 |
| informal | | isflwdby | m | a | | 1 | 1 |
| informal | | isflwdby | a | l | | 1 | 1 |
| inform | informal | isflwdby | i | m | | 1 | 1 |

On selecting 'o' during recording of the 'informal' string, and having recorded the string 'form', one can detect the current relationship as having already been recorded. This and other previously captured relationships from 'f' up until 'm', can be reused by constraining the system to follow the relationships defined in the 'form' situation. This is implemented by applying the 'form' situation as a criterion in the particular assertion of the 'informal' situation concerning 'f' and 'm'.

The same principle is applied in recording the string sequences between words in phrases, and here the benefits of this scheme for recording strings become particularly useful. On the surface, it would seem inefficient and impractical to record text messages in a domain, as a set of sequence relationships between the string pairs constituting them. A 10-word string would require at least 9 such database records, whereas storing it in an unstructured text field in the more traditional manner, would require just a single record.

However as illustrated above, once a phrase has been captured, every sub-phrase of it can be represented using a single record and the recording scheme preserves the entities needed to retrieve the sub-phrase i.e. its first and last string entities. The implication is that once a string pair sequence is asserted, the system can straightforwardly determine every phrase recorded in its memory, which the asserted sequence is part of. This is akin to an inverse-index representation [Zobel, J., Moffat, A. (2006), "Inverted files for text search engines", ACM Computing Surveys, article 6, Vol. 38 No. 2] applied to document collections for search purposes.

This feature is applied in the disclosed system, firstly as described above in its information storage. Secondly it is applied in generating suggested phrases to users in message composition situation, based on their frequency of use and their relevance to the. This above principle in the system's operation is about applying tactics such that the time required to compose messages and the space required to store them is kept at a minimum.

System Usage

The current section aims to present web-based implementation scenarios highlighting the utility of system. Given its relevance of its underlying model to sequential, categorical and hierarchical strings data, the following are key examples of data which the system is particularly suitable for capturing:

Messages in natural languages

Markup (e.g. HTML): These are language structures for content presentation that are understandable by uniformly by all standard internet browsers Taxonomies and metadata As noted earlier there are two components of the system namely the user interface and the server. The server receives data from the client interface in the form of strings, stores these in a domain database in a semantically structured manner, and then retrieves and provides them to the interface on user request in the appropriate situations.

Organisations and institutions can host a system like this on their web domains, which would be accessible to their members and users via a URL format such as this:
http://service.orgdomain.tld Alternatively, they could subscribe to a service provider hosting the system, and making it accessible to their members and users through a subdomain URL as such:
http://orgdomain.serviceprovider.tld Being a hyperlink-driven, the interface is designed to be responsive to the user activity in the form of hypertext clicks or selections. Thus the interface serves to:

layout the set of informational entities representing the user's communicative and interactive situation provide the relevant string entities that the user can interact with to progress into new situations update the display of entities to reflect information about the new situations in response to the user's interaction.

A relational database would provide the system with the capacity for capturing the plethora of symbols and strings in a particular language or domain use, either recorded in real-time user messaging activity or parsed from previous recorded data (from messages and documents).

Linguistic Information Access

Users are able to interact with hyperlinks on the system's interface encoding linguistic string entities, and thus compose words as well as messages. These can subsequently be published and shared—thus facilitating communication.

The set of hyperlinks displayed on the interface are of two kinds. Users can select literal strings denoting terms, contacts, subjects etc or they can select category link used to retrieve literal entities relevant to their current interactive situation. These are entities which either they have defined or which have been defined communally within the domain.

In addition to displaying actual word entities, the interface can display type objects which categorise a set of objects. On clicking a category string, the system retrieves and displays the set of entities associated with the selected type.

FIG. 4 shows a user interaction to enter the word 'the'.

Every interactive string displayed on the interface is associated with a specific class of object. These object classes include: Characters, Terms, Numbers, Contacts, Subjects, which are pre-defined within the system, reflecting the linguistic and communicative nature of the application and its interface. Other classes of objects include [Punctuation] Marks, Actions User—Server Interaction To provide the communications application, the system maintains a representation of the situation of a definite individual present and interacting in a definite domain or communicative setting. A hierarchical set of situational representations is involved which includes, at the top level, a representation of the domain situation in which the user is present, and at a lower level, the situation of linguistic utterances being read or recorded by the user.

In effect what the user is doing, in interacting with the system, is storing linguistic entities in linguistic situations, in terms of their relationship with other linguistic entities in the same particular situations, with all the foregoing entities and situations denoted by strings in the memory of the system. As well as storing the literal entities, users can also store category entities User, Domain, Server Identity The first task performed by the system's server in initialising the remote user interface is to authenticate the domain, which the concerned instance of the server is being hosted in. The name of the domain where the system is being hosted as a web application, is recorded as a string entity—a situation in the system's records. This situation is the grounding for all communicative activity conducted via the hosting server. This allows the domain name to be linked to a unique situation referenced by the server, and thus an executing instance of the server-based application is coupled to a named HTTP domain.

For integrity of the interaction, a particular installation of the web application on a hosting server needs to be linked to its own primary data store providing its situational records or memory; i.e. a particular interface server agent script needs to be coupled uniquely to a specific database. The way in which this is implemented is by maintaining a unique set of field names shared only between the script and the database in which its records are stored.

During initialisation, when a user first accesses the web interface [page]:

A new instance of the interface agent is created and a user session is registered in which the instantiated agent will exist.

The server agent obtains the HTTP host variable and checks that it corresponds to the string registered as the current domain name.

The agent instantiates all the informational entities involved in the initial user interactive environment The preliminary interactive environment is one in an authentication context. This situation is one in which the type of (sub)situation characterised by the presence of a string of the type 'user', constrains the system to switch to the type of situation where a user's presence is actively registered, on the condition that another type of situation is also present or latent—namely a situation where the a string pair denoting the user's id and password have been entered in sequence. Another condition is that an assertion of the current string pair sequence also exists at a time preceding the current session, in a situation which is of the type 'user registration'.

String Representations

A unique string is generated on web servers to denote an instantiated user session from a browser client to the server. This session defining string captured by the server agent, and used to differentiate users who might be interacting within a common domain and accessing its situational memory (database) at the same time. The string is recorded in the timespan field of status assertion records in the system, to distinguish the presence of different users in a domain, and to signify a user's session as his/her primary 'NOW' interval of time.

| SITN | REL | PRM1 | PRM2 | TMP | POL |
|---|---|---|---|---|---|
| David@DOM | is | USER | David | 1fc067643ebbcc06cab107b01103cb79 | 1 |

To generate new strings to uniquely represent objects, situations or time spans in its memory, the system can deploy the simple tactic of creating a sequence randomly generated string characters. Or more elaborately, it can combine instances of already known type of strings. This second tactic is used in particular to create strings that represent the user's primary situation or environment.

'USER'+'@'+'DOMAIN'

This is composed in semblance to the format of an email address, but reflects a new meaning—i.e., to human understanding, the situation of a user's presence in a domain or to the machine understanding, simply another string instance of the situation of such a type.

Thus a number of unique strings are used by the system to identify a particular user's course of interaction with an instance of the server agent: server ID, session, domain, user—and these are all asserted in the situational memory of the system.

Messaging Example

To illustrate the user interaction and operation of the system, the following scenario is presented where one individual 'David' wishes to communicate with another individual 'Peter', by sending a simple message: 'John was here'. We will assume that both individuals are members of a domain registered as 'DOM' and that David has a set of contacts previously placed in his 'friends' category in the system's memory. It is also assumed that the English characters, some character sequences, some words have also already been stored in the system's memory.

David accesses the system's web frontend on the cambridge.net domain, and is presented with an interface requesting a User entry for authentication. On clicking on the text entry box, a set of characters appear by which David can compose the word 'D-a-v-i-d'. With each character selection, the set of characters displayed changes to anticipate the next character he intends to select, arranged in order of the most likely succeeding characters. This is enabled as a result of the server interpreting the interactive situation, informed by the current character selection together with the set of other characters already selected.

On completing the word and entering it, the string entry selector previously indicating 'User' changes to 'Password', and the text box switches to the password encrypted mode. Again the password string can be entered with the provided characters on screen, the difference now being that the displayed characters are not changing to predict subsequently required ones.

The ongoing scenario can be represented in the system's memory as follows:

| SITN  | REL     | PRM1     | PRM2    | TMP     | POL | CRIT  |
|-------|---------|----------|---------|---------|-----|-------|
| BU9D2 | is      | USER     | David   | DKZAE   | 1   |       |
| BU9D2 | is      | PSWD     | xyz123  | 2C288   | 1   |       |
| BU9D2 | isflwdby| David    | xyz123  | SGV05   | 1   |       |
| 695LE | isflwdby| David    | xyz123  | 9K065   | 1   |       |
| MCVOK | isflwdby| USER     | PSWD    | NOW     | 1   |       |
| MCVOK | isflwdby| USER     | PSWD    | THEN    | 1   |       |
| 446Q7 | leadsto | UserLogin| Logged-In|        | 1   | MCVOK |
| DOM   | typeof  | MCVOK    | CRIT    |         | 1   |       |
| DOM   | typeof  | UserLogin| SITN    |         | 1   |       |
| DOM   | typeof  | LoggedIn | SITN    |         | 1   |       |

The user authentication scenario represented in the system's memory

Here the string BU9D2 represents the user David's current interactive situation, with the timestamps involved DKZAE, 2C288 and SGV05 being part of the NOW time interval. The string 695LE represents a historical interactive situation of David in which his log in credentials were entered in the same sequence currently being enacted, with the timestamp 9K065 being determined by the system as representing a time interval in that historical situation.

An additional criterion (CRIT) field in included in the system's implementation for the control and variation of instances of a particular type of situation. A criterion within the system's ontology is itself a type of situation which when included in some asserted formal information, conditions the main situation concerned in the record. So as illustrated in the inferencing records above, the MCVOK criterion stipulates that a 'UserLogin' situation when encountered will lead to a 'LoggedIn The system switches from the 'user login' to the 'logged in' type of situation once a set of assertion criteria have been satisfied. Otherwise the user David is returned to the root domain situation, which initiated the 'User' string entry.

FIG. 5 shows a conceptual structure of a communicative setting.

User and Domain Environment

When a user logs in, they enter into a communicative environment within a domain. There would typically be other users sharing this environment, creating a potential variety of communicative situations. A communicative situation is a relationship established between actual domain-user entities, which firstly defines a FROM role and a TO role for these entities, and then subsequently supports the creation of messages. The current user, i.e. the user recognised to the server as logged in over a particular session, can navigate through this communicative milieu by focusing [cognitively] on certain types of other entities [like itself]—its contacts—with which it would like to be in communication. It thus chooses particular types of communicative situations.

A moderating factor determines which entities in the communicative environment are assigned to the FROM and TO roles. This factor allows two conditions or states defined with respect to the current user: a read/listen/browse mode (the default mode) and a speak/write/entry mode.

In the read mode, the current user is navigating through communicative situations or communicative situation types, by assigning contact entities to the FROM role. The current user is itself assigned to the TO role [or the TO role is anchored to the user], incorporating all the categories to which the current user is subscribed. Conversely in the write mode, the current user is navigating through communicative situations or communicative situation types, by assigning contact entities to the TO role. The current user is itself assigned to the FROM role [or the FROM role is anchored to the user, incorporating all the categories to which the current user is subscribed.

So to pick up on the example, the system asserts 'David' as the current user in his personal environment or situation in the domain, i.e. 'David@DOM', positioned in the read mode. He subsequently performs the following actions:

Selects his desired category of contacts 'friends': The server responds by sending a list of contacts belonging to the selected category to be displayed on the interface. This action also triggers a type of communicative situation with 'friends' in the FROM role and 'David' in the TO role. The server consequently responds by sending all the messages that are a part of this communicative situation.

Selects his desired contact 'Peter': The communicative situation is set to that with 'Peter' in the FROM role, and thus the set of messages displayed is narrowed down.

Selects the write mode: The roles in the communicative situation type are switched, and the new communicative situation provides a context for a new message to be constructed. A message composition area appears on the interface and the server responds by sending the relevant string class for entry 'Term', which is displayed in the string entry selector. Accordingly, a new message type situation is instantiated by the server agent in the system's memory.

Begins creating the message text: He proceeds by selecting the first characters of the first word intended i.e. 'j'. The server responds by sending firstly, the list of possible subsequent characters arranged in sequence. Secondly, it sends a list of string entities which have 'j' as their first character and are instances of the 'Term' string class. The user can either select 'john' if it is displayed in the list, or if not immediately displayed, can continue to select the subsequent characters required to compose the string. Each selection appends the selected character to the textbox string.

The current interaction is illustrated in FIG. 6 below, and the relevant assertions in the system's memory are highlighted subsequently.

FIG. 6 shows information processing between Interface and Server to support a Messaging task.

| SITN | REL | PRM1 | PRM2 | TMP | POL |
|---|---|---|---|---|---|
| Status | | | | | |
| 1 532JF | is | TERM | John | 0R214 | 1 |
| Inferencing | | | | | |
| 2 72CGG | is | TERM | STRING | NOW | 1 |
| 3 QF29X | has | TERM | OBJTYP | | 1 |
| 4 UTTR | isflwdby | TERM | TERM | | 1 |
| 5 DV29O | isflwdby | person | action | | 1 |
| Defining | | | | | |
| 6 DOM | inst | John | person | | 1 |
| 7 DOM | instof | came | action | | 1 |
| 8 DOM | instof | was | action | | 1 |
| 9 DOM | instof | TERM | OBJ | | 1 |
| 10 DOM | typeof | person | TERM | | 1 |
| 11 DOM | typeof | action | TERM | | 1 |
| 12 DOM | typeof | 72CGG | SITN | | 1 |
| 13 DOM | typeof | QF29X | SITN | | 1 |
| 14 DOM | partof | 72CGG | UTTR | | 1 |

After composing 'j-o-h-n' and selecting an entry button, the string 'john' becomes the current focal entity. The information in assertion 1 is recorded in the system's memory. Abstracting over the formal information, the system infers the type of situation in assertion 2. All this the system has been registering 'David@DOM' as the currently prevailing situation. Given that this inferred situation '72CGG' is defined as being part of an utterance situation 'UTTR' and given that this type of situation also has 'Term' (a proxy for 'john') as its focal entity and as a future entity, a new instance of the UTTR situation is created as part of 'David@DOM' and the system treats this new situation as the current situation.

The 'has' relation string illustrated is used to denote a 'has the property' relationship apparent between strings. Given the inferencing assertion that a 'Term' has an object-type associated with it, the server obtains the literal string types (categories) associated with 'John' in its memory. If any, the interface displays this. It also includes a 'Category' provides the user features to add a new one.

In the system's defining assertions illustrated, 'john' belongs to a user defined category 'person', which is itself a type string of 'Term' string class. Given the inferencing assertion that a 'person' type string is followed by an 'action' type string, the system can infer that instances of the 'action' type string would be possible terms following the string 'john'.

Thus to continue the interaction, the current user David:
Selects or composes successive strings: 'john-was-here'. With each selection, the interface appends the selected string to the string displayed in the message composition area. This is by manipulating the content of the HTML elements in this area.

Completes message by selecting a 'post' action: The server interprets this action by ending the current utterance situation and making that a part of the current message situation. The message type of situation is one which records a succession of utterances in the same manner that an utterance records a succession of word string entities. This message situation in turn becomes a part of the current communicative situation.

Switches back the read mode: This is done automatically by the system and accordingly, the new message just created appears in the list of messages displayed.

Correspondingly, when the user 'Peter' logs into the domain in a similar manner outlined above, he also sees the newly created message. This is by virtue of the fact that Peter, in his interface read mode, can access the communicative situation having 'David' in the FROM role and himself in the TO role.

Text aspects such as string display format and punctuation marks have not been highlighted in this illustration, but follow similar operations within the system. It is worth noting though that in the preferred implementation, string entities in a language, unless explicitly specified, are stored in the system's memory in a uniform case and are treated in a case insensitive manner. The act of specifying a certain case for their display is treated as a situation, and such types of situations can also be recorded and interpreted by the system.

Message String Recording and Retrieval

The methodology employed for storing in the system's memory a representation of words and message strings created on the interface for later retrieval is as follows:

Writing: In response to the successive selection of individual string entities, whether characters or words (or at an advanced stage, phrases), the system records a unit of information formally representing the assertion that one string entity follows another in a currently ongoing situation. By storing strings in variables, classes and related session objects, a web server environment help maintain this representation of the current utterance situation, across the successive users interactions on the system's interface.

Thus a situation can be maintained supporting the compound assertion that:
A particular string entity (the first) is followed by another string entity (the second) and
the second string entity is followed by another string entity (the third) and
the third string entity is followed by another string entity (the fourth) and so on . . .
until that the (n-1)th string entity is followed by another string entity (the last)

| SITN  | REL     | PRM1 | PRM2 | TMP | POL |
|-------|---------|------|------|-----|-----|
| C48D7 | isflwdby | john | was  |     | 1   |
| C48D7 | isflwdby | was  | here |     | 1   |
| 73DP0 | inst    | C48D7 | MSG |     | 1   |
| 2IDN4 | isflwdby | here | yesterday | | 1 |

Each entity recorded must be unique in its relationship to other entities manifest in a situation. Often in a composed string, a few of the individual string entities involved might occur more than once, which in the representation scheme above might lead to problems in reconstructing the overall string. For example in the string 'He is aware of what the situation is', which can be taken as a particular utterance situation, the string entity 'He' is followed by the entity 'is', but the entity 'situation' is also followed by the entity 'is'.

In its preferred implementation, a way to solve this is by the system declaring another unique string say 'w90 kv', in this immediate situation, as an alias for the string entity 'is'. This would then substitute for the second string entity 'is' in its relationship with 'situation'.

| SITN  | REL      | PRM1      | PRM2      | TMP | POL |
|-------|----------|-----------|-----------|-----|-----|
| 1K7FG | isflwdby | He        | is        |     | 1   |
| 1K7FG | isflwdby | is        | aware     |     | 1   |
| 1K7FG | isflwdby | aware     | of        |     | 1   |
| 1K7FG | isflwdby | of        | what      |     | 1   |
| 1K7FG | isflwdby | what      | the       |     | 1   |
| 1K7FG | isflwdby | the       | situation |     | 1   |
| 1K7FG | aliasof  | w90kv     | is        |     | 1   |
| 1K7FG | isflwdby | situation | w90kv     |     | 1   |
| DOM   | inst     | 1K7FG     | UTTERANCE |     | 1   |

In the above sense, situations in the system's recording and representation scheme act like a namespace—an abstract container providing context for the items (names, terms or words) recorded in it, and allowing disambiguation of items having the same name.

Reading: The interpretation of this compound assertion by the system would a single concatenated string composed of the string entities asserted about, arranged in sequence of their entry. Using a relational database records, This could be a single word composed of contiguous characters or, if the concatenated string entity was defined as representing a situation of the utterance of words, the sub-strings would, for human readability, be interspersed with 'spaces' to appear as a phrase or sentence.

The system identifies all the sub-assertions constituting the given situation, which include a representation of the 'is followed by' relationship. From this set it iteratively chains the string entities involved, using the information provided by the leading and trailing strings in each assertion.

Retrieval and Presentation of Phrase Suggestions

A method of recording frequently used sequences of strings, involving more than one term entity, as well as the type of situations in which they are used. This is aimed at reducing the time needed to select strings needed in composing messages. It is also to optimize the space required to present a choice of phrase suggestions Consider the following uttered sentences:

We are going there tomorrow early in the morning

He came early in the morning to see her

Early in the morning, I have a cup of tea

The system records these in its model, as presented in the following table:

| SITN  | CRIT  | REL      | PRM1     | PRM2    | TMP | POL | St1 | St2 | Use |
|-------|-------|----------|----------|---------|-----|-----|-----|-----|-----|
| jk34x |       | isflwdby | we       | are     |     | 1   | 1   | 1   | 1   |
| jk34x |       | isflwdby | are      | going   |     | 1   | 1   | 1   | 1   |
| jk34x |       | isflwdby | going    | there   |     | 1   | 1   | 1   | 1   |
| jk34x |       | isflwdby | there    | tomorrow|     | 1   | 1   | 1   | 1   |
| jk34x |       | isflwdby | tomorrow | early   |     | 1   | 1   | 1   | 1   |
| jk34x |       | isflwdby | early    | in      |     | 1   | 1   | 1   | 2   |
| jk34x |       | isflwdby | in       | the     |     | 1   | 1   | 1   | 2   |
| jk34x |       | isflwdby | the      | morning |     | 1   | 1   | 1   | 2   |
| 19pd1 |       | isflwdby | he       | came    |     | 1   | 1   | 1   | 1   |
| 19pd1 |       | isflwdby | came     | early   |     | 1   | 1   | 1   | 1   |
| 19pd1 | jk34x | isflwdby | early    | morning |     | 1   | 1   | 1   | 1   |
| 19pd1 |       | isflwdby | morning  | to      |     | 1   | 1   | 1   | 1   |
| 19pd1 |       | isflwdby | to       | see     |     | 1   | 1   | 1   | 1   |
| 19pd1 |       | isflwdby | see      | her     |     | 1   | 1   | 1   | 1   |
| ...   | ...   | ...      | ...      | ...     | ... | ... | ... | ... | ... |
| ...   | ...   | ...      | ...      | ...     | ... | ... | ... | ... | ... |
| dsqq8 | jk34x | isflwdby | early    | morning |     | 1   | 1   | 1   | 1   |
| 06k26 |       | instof   | dsqq8    | _PHRASE |     | 1   | 1   | 1   | 1   |
| pl119 |       | has      | dsqq8    | ,       |     | 1   | 0   | 1   | 1   |
| 06k26 |       | isflwdby | i        | have    |     | 1   | 1   | 1   | 1   |
| 06k26 |       | isflwdby | have     | a       |     | 1   | 1   | 1   | 1   |
| 06k26 |       | isflwdby | a        | cup     |     | 1   | 1   | 1   | 1   |
| 06k26 |       | isflwdby | cup      | of      |     | 1   | 1   | 1   | 1   |
| 06k26 |       | isflwdby | of       | tea     |     | 1   | 1   | 1   | 1   |
| pl119 |       | isflwdby | dsqq8    | 06k26   |     | 1   | 0   | 0   | 1   |

Firstly, it is noted that in recording the second sentence '19pd1', the system references the relationships from the first sentence between 'early' and 'morning', as a criterion 'jk34x'.

Given the structured relationships in which strings are recorded, the system can keep detecting sequences being selected or entered in an ongoing basis, without having to define such sequences as distinct phrase entities. When a user, in composing a message, gets into a situation that is part of a recorded sequence, the likely full phrase could be suggested to the user. This, along with other relevant entities, would be presented on the user interface in order of their predicted relative relevance to the user's current selection.

So having had this same 'early in the morning' sequence reused a number of times across different sentences, this could be detected to be a distinct entity. The 'Use' data elements highlighted above record this repeated usage, by which the system could determine whether a sequence has been re-used significantly enough to become recognised phrase.

When a likely phrase sequence suggested to a user is actually selected, it becomes registered as a defined entity. As a distinct situation-class entity, a phrase could be tagged with categories of its own independent of the terms constituting it.

Language Ontology

The disclosed system's methodology affords capturing an ontology of natural languages entities. An ontology is a way of describing the categories of things that are in the world—in the current case, the world of symbols and strings in a language used by a community. Furthermore the system provides a way of relating and recording these categories contextually in the course of messaging and tagging—thus according to the way they used in natural communication and sense-making.

As has been described earlier, the system's interface provides features whereby individual terms and string entities entered in the course of messaging activity, can be tagged with categories meaningful to the user. Using a dropdown selector on the interface, which defines the class of string to be entered, a user can switch between entering a normal message string (term) or a tagging string (category). This is stored in the system's model as the assertion that the said term is an instance of the said category.

It will be noted that a particular term can be associated with a number of different categories, due to different senses or different users of the term. Multiple associations of a term to a particular category by different users, or in different situations, indicates a stronger relationship between the two string entities. Such associative strength is captured by the usage metric recorded by the system for each asserted item of information in its model.

The system would continually update and refine its representation of string relationships and their validity as individuals use the entities in its ontology.

Context Recording and Selection

When a particular string is followed by another string in sequence, both strings associated with different categories, it can be asserted that one category (that of the first string) is followed by another category (that of the second). The assertion that one definite string entity is followed by another such entity represents a particular situation. In a corresponding manner, the assertion that one string category is followed by another string category represents a particular situation type. The former situation is an instance of the latter type of situation.

A context string entity is one which can be entered via the interface to mark the kind of situation that a string sequence is about. It persists on the interface while the user enters a succession of strings forming an utterance or message. Thus it denotes a situation type in the system's ontology, and can represent a topic, subject or characteristic of an encoded string sequence in a language.

Consider the statements: 'He is here', 'He is coming soon' and 'He is coming round'. Also assume the first two utterances have to do with 'arrival' and the last has to do with 'health'. The following table analyses the system's model and recording of the statements.

The three proposed string sequences recorded in literal assertions

| SITN | CRIT | REL | PRM1 | PRM2 | TMP | POL | Use |
|---|---|---|---|---|---|---|---|
| 2yp1q | | _isflwdby | he | is | | 1 | 1 |
| 2yp1q | | _isflwdby | is | here | | 1 | 1 |
| fq1Hhl | | _isflwdby | he | is | | 1 | 2 |
| fq1Hhl | | _isflwdby | is | coming | | 1 | 2 |
| fq1Hhl | | _isflwdby | coming | soon | | 1 | 1 |
| vbz4z | FQ1HL | _isflwdby | he | coming | | 1 | 1 |
| vbz4z | | _isflwdby | coming | round | | 1 | 1 |

Using the subsequent records, the system defines the entities in the above sequences, as instances of other category entities entered by users. Each of the second entities in the relationship would be in turn defined as a type of a certain class of entity (for example: ['_typeof', 'pronoun', '_TERM', 1] in the ['domain'] situation). For brevity, these are omitted from the current listing.

| | | | | | | | |
|---|---|---|---|---|---|---|---|
| domain | | _instof | he | pronoun | | 1 | 1 |
| domain | | _instof | he | person | | 1 | 1 |
| domain | | _instof | is | be | NOW | 1 | 1 |

The record above holds the assertion that 'is' is an instance of the 'be' category in a 'NOW' timeframe. The is a way of represent the notion that 'is' is a form of the verb 'to be' in the present tense

| | | | | | | | |
|---|---|---|---|---|---|---|---|
| domain | | _instof | is | verb | | 1 | 1 |
| domain | | _instof | is | auxilliary | | 1 | 1 |
| domain | | _instof | here | location | | 1 | 1 |
| domain | | _instof | coming | [come] | NOW | 1 | 1 |
| domain | | _instof | coming | verb | | 1 | 1 |
| domain | | _instof | soon | timing | | 1 | 1 |
| domain | | _instof | round | condition | | 1 | 1 |
| domain | | _instof | _TOPIC | _SITUATION | | 1 | 1 |

In addition, the following assertions are recorded which the system can use to infer a situation type or entities relevant to it. These are various relationships between the categories involved in the uttered string sequences

| The three proposed string sequences recorded in literal assertions | | | | | | |
|---|---|---|---|---|---|---|
| u5n32 | _isflwdby | pronoun | verb | | 1 | 1 |
| jb2m6 | _isflwdby | pronoun | auxilliary | | 1 | 1 |
| 14y2r | _isflwdby | auxilliary | verb | | 1 | 1 |
| 9ln5b | _isflwdby | [come] | timing | | 1 | 1 |
| 69q8u | _isflwdby | [come] | condition | | 1 | 1 |
| 8fh0f | _isflwdby | verb | location | | 1 | 1 |
| 5pj44 | _isflwdby | verb | condition | | 1 | 1 |
| 1m58k | [come] | pronoun | location | | 1 | 1 |
| 688q7 | [come] | pronoun | timing | | 1 | 1 |
| e0x8a | coming | pronoun | condition | NOW | 1 | 1 |
| The subsequent assertions record what context strings (topical situation types known to users), that the above situation type fragments are part of or about. | | | | | | |
| domain | _partof | u5n32 | arrival | | 1 | 1 |
| domain | _partof | jb2m6 | arrival | | 1 | 1 |
| domain | _partof | 14y2r | arrival | | 1 | 1 |
| domain | _partof | 9ln5b | arrival | | 1 | 1 |
| domain | _partof | 8fh0f | arrival | | 1 | 1 |
| domain | _partof | u5n32 | health | | 1 | 1 |
| domain | _partof | jb2m6 | health | | 1 | 1 |
| domain | _partof | 14y2r | health | | 1 | 1 |
| domain | _partof | 69q8u | health | | 1 | 1 |
| domain | _partof | 5pj44 | health | | 1 | 1 |

Assuming that users have previously entered and tagged the string entities and utterances stated above, with their associated categories and contextual topic, the situational information thus recorded could be used to retrieve relevant entities in some messaging activity.

When another user enters the sequence, 'he' and 'is', the context strings 'arrival' and 'health' are retrieved via database queries and become available in the context selection area of the interface (highlighted in FIG. 2). Assuming further that besides 'soon' and 'round', a number of different terms have been entered following the string 'coming'. Faced with a large number of alternatives, it is the selection of one of the available context strings 'arrival' or 'health' by a user, that would enable the system suggest either 'soon' or 'round' as the most likely entity that the user needs to enter next.

HTML Structures

The system can record and represent the set of strings and structures in HTML used for content presentation, which are understood uniformly by all standard internet browsers.

| SITN | REL | PRM1 | PRM2 | TMP | POL | CRIT |
|---|---|---|---|---|---|---|
| DOM | instof | _UTTR | SIT | | 1 | |
| DOM | instof | _MARKUP | SIT | | 1 | |
| DOM | instof | <h1> | 1HTMLTAG | | 1 | |
| DOM | instof | <p> | 1HTMLTAG | | 1 | |
| DOM | instof | <ul> | 1HTMLTAG | | 1 | |
| DOM | instof | <li> | 1HTMLTAG | | 1 | |
| DOM | instof | class | 1HTMLATTR | | 1 | |
| DOM | typeof | hl_markup | 1MARKUP | | 1 | |
| DOM | typeof | ul_markup | 1MARKUP | | 1 | |
| MARKUP | has | <ul> | <li> | | 1 | |
| MARKUP | has | _HTMLTAG | _HTMLATTR | | 1 | |
| MARKUP | has | class | _STRING | | 1 | |
| hl_markup | flwdby | <h1> | </h1> | | 1 | _UTTR |
| message | instof | abc123 | _UTTR | | 1 | |
| message | instof | XYZ456 | hl_markup | | 1 | |
| message | has | abc123 | xyz456 | | 1 | _CASING |

The set of records in the above table represents a scenario whereby if the utterance instance '_UTTR' referred to some concatenated string 'An Information System', then when its associated message was parsed for display, it would be rendered as '<h1>An Information System</h1>'.

Further Utility and Deployment

A disclosed system reflects language neutral methodology to interactively and intuitively recording content via web interfaces. It is applied to thus enhance the usability of the web, by conceiving every click or selection on a browsing interface as some sort of communicative utterance, and supporting accordingly. The methodology behind the system enables it to be adaptable to the peculiarities and changing manner in which people in a given setting use language.

The information recording, representation, retrieval and reuse capabilities described in the system's operation, make it applicable to managing information in personal as well as shared space. A user's personal space in a certain domain can be clearly defined, stored and represented in an email-address like fashion. This indicates as a part of the overall domain situation where information pertaining to a user exists and is recorded. It would include information such as contacts, subjects as well as situations which they typically communicate about. By selecting contacts and assigning them categories, individuals can manage the messages they access as well as their communicative scenarios within a domain. The overall domain however is where all linguistic and interactive information and entities, shareable and accessible to all its members, are indexed and stored.

The system's server provides inherent search utility, given that all content maintained in its memory is in a structured format and every string entity is indexed to a defined situation. As outline earlier, every recorded string sequence can be used to infer an utterance, message, communicative situation as well as a subject of which is it a part.

The kinds of content that can be produced using the system are not limited to plain text messages. As can be observed, HTML tags are browser recognised strings that surround other strings. They can be treated as another class of entities whose string relationships with other content can be asserted, recorded and subsequently retrieved for appropriate rendering within browsers. This generates possibilities for creating rich forms of content via the system.

The population of the system's database memory occurs collaboratively as individuals create messages and content via its interface. String information communicated by users in the domain, become readily accessible and usable. In addition it is possible for users across domains to shared messages and content. This is possible by setting up another system of the same nature to the current one but of larger scope, in order to define a super-domain or wider communicative context for particular domains to subscribe to and register relationships with other domains. This would need to operate in a wider and secure brokering framework across the interne.

No doubt many other effective alternatives will occur to the skilled person. It will be understood that the invention is not limited to the described embodiments and encompasses modifications apparent to those skilled in the art lying within the scope of the claims appended hereto.

What is claimed is:

1. A lossless method of storing characters, words and phrases including the words, in real-time in a data structure for providing real-time predictive output of characters, words and/or phrases in response to user input text data, the method comprising:
   receiving user input text data comprising at least one of characters, words and phrases, one entity at a time in sequence;
   storing a plurality of phrases in a memory, one entity at a time in sequence, each in a phrase data structure, each phrase in said phrase data structure having a unique phrase identifier identifying an instance of a phrase and comprising a sequence of words of the phrase, wherein some of said phrase data structures further comprise subphrase identifier data, said subphrase identifier data comprising a phrase identifier identifying a portion of a phrase of a phrase data structure which corresponds to some or all of another phrase stored in a said phase data structure one or more records, each phrase comprising a record for each neighbouring pair of words in said phrase, each record defining data for neighbouring words in said phrase, each record comprising: said phrase identifier, a first neighbouring word in said phrase, a subsequent neighbouring word in said phrase and data indicating a relationship between said first and subsequent neighbouring words in said record;
   identifying, via a processor, a previous use of a subphrase in said user input text data, a said previous use of said subphrase corresponding to some or all of a phrase stored in said phrase data structure, and retrieving said phrase identifier for said previous use of said subphrase in response to said identification; and
   storing data for a subsequently input phrase in the memory, said phrase including said subphrase from said user input text data including said subphrase in said data structure as a combination of one or more said records and a subphrase record, said subphrase record comprising said phrase identifier identifying for said phrase containing said subphrase, a start word of said subphrase, an end word of said subphrase, a remainder of said subsequently input phrase after removal of said subphrase, and data indicating a relationship between said reminder of said subsequently input phrase and said subphrase start and end words of said subphrase, and subphrase identifier data, said subphrase identifier data comprising said phrase identifier identifying said phrase containing said previous use of said subphrase.

2. A method according to claim 1, comprising generating a new phrase comprising said subphrase and allocating a phrase identifier to said new phrase such that said phrase identifier of said subphrase comprises a new phrase identifier.

3. A method according to claim 1, further comprising inferring a situation of use of said predictive output from said user input text data, and wherein said storing and identifying of said repeated subphrases is responsive to said inferred situation of use.

4. A method according to claim 1, wherein said identifying of said previous use of said subphrase comprises identifying greater than a threshold count of instances of said previous use of said subphrase.

5. A method according to claim 1, wherein said relationship comprises one of "currently referring to", "is an instance or example of", "is a type, category or group of", "has the property, aspect or entity", "is followed by", is an alias of" and "is a part of or is about".

6. A method according to claim 1, wherein said phrase data structure comprises criteria data defining a dependency of said relationship in said record on another set of records stored in said phrase data structure for another phrase.

7. A method according to claim 1, wherein a said record in said phrase data structure comprises polarity data defining a positivity or negativity of a said subphrase.

8. A method according to claim 1, wherein a said record in said phrase data structure comprises a timespan identifying defining a temporal period of validity of the assertion represented in a said phrase record or a said subphrase record.

9. A method according to claim 8, wherein a said record in said phrase data structure comprises data defining a relationship between timespan identifiers of different phrase records and subphrase records in said phrase data structure.

10. A method according to claim 1, wherein said phrase data structure comprises usage data defining a frequency of use of a stored subphrase, and wherein said usage data is increased upon successful identification of a previous use of a said subphrase.

11. A method of predicting phrases in response to user input text data, the method comprising:
    inputting multiple instances of said text data, each comprising a phrase;
    storing said phrases in a data store using the method of claim 1;
inputting a further instance of said text data;
identifying words within said further instance of said text data during said inputting;
    matching said words with said stored phrases during said inputting; and
    outputting data for providing to said user predicted further words of a phrase predicted by said matching.

12. A method according to claim 11, further comprising storing at least one of punctuation marks and text markup tags in association with words and phrases in said records of said stored phrase data structure, and wherein said outputting further comprises outputting said at least one of punctuation marks and text markup tags to enable formatting of said reconstructed input text.

13. A computer system for providing predictive output of words and/or phrases in response to user input text data, the computer system comprising:
    an input to receive said user input text data;
    an output for providing to said user predicted further words of a phrase predicted by said system;
    a data store storing a plurality of phrases each in a phrase data structure, each phrase in said phrase data structure having a unique phrase identifier identifying an instance of a phrase and comprising one or more records, each phrase comprising a record for each neighbouring pair of words in said phrase, each record defining data for neighbouring words in said phrase, each record comprising: said phrase identifier, a first neighbouring word in said phrase, a subsequent neighbouring word in said phrase and data indicating a relationship between said first and subsequent neighbouring words in said record; and computer program code for:

inputting multiple instances of said text data, each comprising a phrase, one entity at a time in sequence;

storing said multiple instances of said text data, one entity at a time in sequence, in said phrase data structure as one or more records;

identifying a previous use of a subphrase in said user input text data, a said previous use of a subphrase corresponding to some or all of a phrase stored in said phrase data structure, and retrieving said phrase identifier for said previous use of said subphrase in response to said identification;

storing said phrase including said subphrase from said received user input text data in said data structure as a combination of one or more of said records and a subphrase record, said subphrase record comprising said phrase identifier for said phrase, a start word of said subphrase, an end word of said subphrase, data indicating a relationship between said first and end words of said subphrase and subphrase identifier data, said subphrase identifier data comprising said phrase identifier identifying said phrase containing said previous use of said subphrase;

inputting a further instance of said text data;

identifying words within said further instance of said text data during said inputting;

matching said words with said stored phrases during said inputting; and outputting data for providing to said user predicted further words of a phrase predicted by said matching.

* * * * *